Patented Mar. 1, 1938

2,109,503

UNITED STATES PATENT OFFICE 2,109,503

SEPARATION OF SACCHARIDES

Gustave T. Reich, Philadelphia, Pa.

No Drawing. Application July 7, 1936, Serial No. 89,474

5 Claims. (Cl. 127—48)

This invention relates to the separation of saccharides from non-saccharide substances associated therewith. It is particularly adapted to the separation of sugars from non-sugars in industrial products such as molasses.

A principal object of the invention is to provide a method for separating sugars from non-sugars associated therewith in a high yield and a high state of purity.

A further object is the recovery of saccharides from industrial products containing them in association with non-saccharides without the destruction or conversion of either the saccharide or the non-saccharide substances.

A further object is the recovery of the substances contained in industrial products and by-products in a condition of highest value.

Among the sugar-containing products to which the invention may be applied advantageously are molasses, sweet waters, cane or beet juice and similar materials which may contain sucrose, levulose, dextrose, raffinose, and the like, associated with various organic and inorganic non-saccharides such as gums, potash salts and other known substances.

The method of the invention comprises the treatment of the sugar-containing materials with an organic liquid in the presence of a gas. It has been found that a large number of liquids in which sugars are insoluble or only slightly soluble will, under the influence of a gas, selectively dissolve sugars from aqueous mixtures containing the same even at ordinary temperatures.

An illustrative example of a method embodying the principles of the invention is the following:

1000 gallons of cane molasses of 85° Brix and containing approximately 30% sucrose, 22% invert sugar and 34% non-sugars, of which about 10–11% are inorganic and 23–24% are organic, are mixed with 4000 gallons of ethyl acetate and ammonia gas is introduced into the mixture nearly to saturation at 20° C. and atmospheric pressure with agitation. Upon stopping the agitation two layers are formed. The upper layer comprising the ethyl acetate contains 90 to 95% of the sugars, together with only about 15% of the non-sugars contained in the molasses, mostly organic. The lower layer contains the major part of the non-sugars with 5 to 10% of the original sugar content.

Upon removing the ammonia from the ethyl acetate portion by heating or applying a vacuum a substantial portion of the sucrose crystallizes out in soluble form. The remainder of the sucrose and the invert sugar may advantageously be converted to alcohol by fermentation and since most of the non-sugars have been eliminated the residue of the fermentation presents no difficulty in disposal in contrast to the distillery slop obtained in the fermentation of molasses and similar materials.

The lower layer containing the non-sugars may advantageously be converted into valuable products by drying and charring. The potash salts are leached from the charred material leaving a valuable char for use in clarifying, decolorizing and the like.

Similar results to the above are obtained, for example, by mixing 1000 gallons of molasses with 2000 gallons of 190 proof ethyl alcohol and introducing ammonia at 20° C. under 25–50 pounds pressure, or by mixing 1000 gallons of molasses and 1500 gallons of alcohol and introducing ammonia at a temperature of 0° C. and a pressure of 75 pounds. The pressure and temperature are interdependent upon each other and upon the nature and proportion of the liquid medium, the amount of water in the material being treated and the nature of the gas. In general, temperatures of from −20° to 60° C. may be used. Other gases, such as carbon dioxide, sulfur dioxide, chlorine, air, nitrogen and normally gaseous hydrocarbons may be used in place of ammonia.

When using other gases than ammonia a higher pressure is usually required. In general, the pressure necessary increases with decreasing solubility of the gas. For example, when using ethyl alcohol as the liquid, carbon dioxide at 75 pounds pressure or air at 100 pounds pressure, results similar to those obtained by the use of ammonia at 25 pounds pressure are attained.

A large number of organic liquids may be used in place of ethyl alcohol and ethyl acetate, including other alcohols such as methyl and isopropyl, esters, ketones, for example, acetone, amines, aliphatic and aromatic hydrocarbons, such as petroleum hydrocarbons, benzol and toluol, mineral and vegetable oils, and heterocyclic organic liquids, such as pyridine and furfural.

It is, of course, convenient in carrying out the process, to use a liquid of relatively low boiling point, and it is economically desirable to use a cheap liquid.

The volume of liquid used will depend on the nature of the liquid and the other conditions. When using ethyl alcohol in the presence of ammonia, one to four volumes of alcohol to one volume of molasses have been found to be suitable.

The ammonia may be introduced into the mixture of the liquid and molasses, or the molasses and the liquid may be separately treated with ammonia and thereafter mixed together.

In general, when using organic solvents miscible with water, it is desirable to treat materials having a relatively low water content, such as liquid or anhydrous molasses. Materials containing relatively large amounts of water are advantageously concentrated, for example, to a solids content of 50% or over, before subjecting them to the treatment of the invention, or organic liquids are selected which are immiscible with the water-containing material to be treated.

The separation of the two layers containing, respectively, the saccharide and the non-saccharide materials may be effected by any conventional means, such as decantation or centrifuging.

When the ammonia is disengaged from the separated portions it may advantageously be immediately reintroduced into a further batch of material to be treated.

I claim:

1. A method of recovering sugars from molasses and the like which comprises mixing the molasses with from one to four volumes of ethyl alcohol to each volume of molasses in the presence of ammonia under superatmospheric pressure at a temperature of from about $-20°$ to $60°$ C., separating the ethyl alcohol from the undissolved material, and removing the ammonia from the ethyl alcohol.

2. A method for the recovery of sugars from aqueous compositions containing sugar in association with non-sugars which comprises subjecting the aqueous composition to the conjoint action of an organic liquid immiscible with said composition and gaseous ammonia and separating the organic liquid containing dissolved sugars from the undissolved portion of the aqueous composition.

3. A method for the recovery of sugars from molasses which comprises subjecting molasses to the conjoint action of an organic liquid immiscible with the molasses and a gas at superatmospheric pressure and separating the organic liquid containing dissolved sugars from the undissolved portion of molasses.

4. A method for the recovery of sugars from molasses which comprises subjecting molasses to the conjoint action of an organic liquid immiscible with the molasses and gaseous ammonia and separating the organic liquid containing dissolved sugars from the undissolved portion of molasses.

5. A method for the recovery of sugars from molasses which comprises subjecting molasses to the conjoint action of an organic liquid immiscible with the molasses and gaseous ammonia and separating the organic liquid containing dissolved sugars from the undissolved portion of molasses and removing the ammonia from the organic liquid.

GUSTAVE T. REICH.